July 17, 1951  E. E. SCHNELL  2,561,236
GRAIN DRILL
Filed Nov. 1, 1946  2 Sheets-Sheet 1
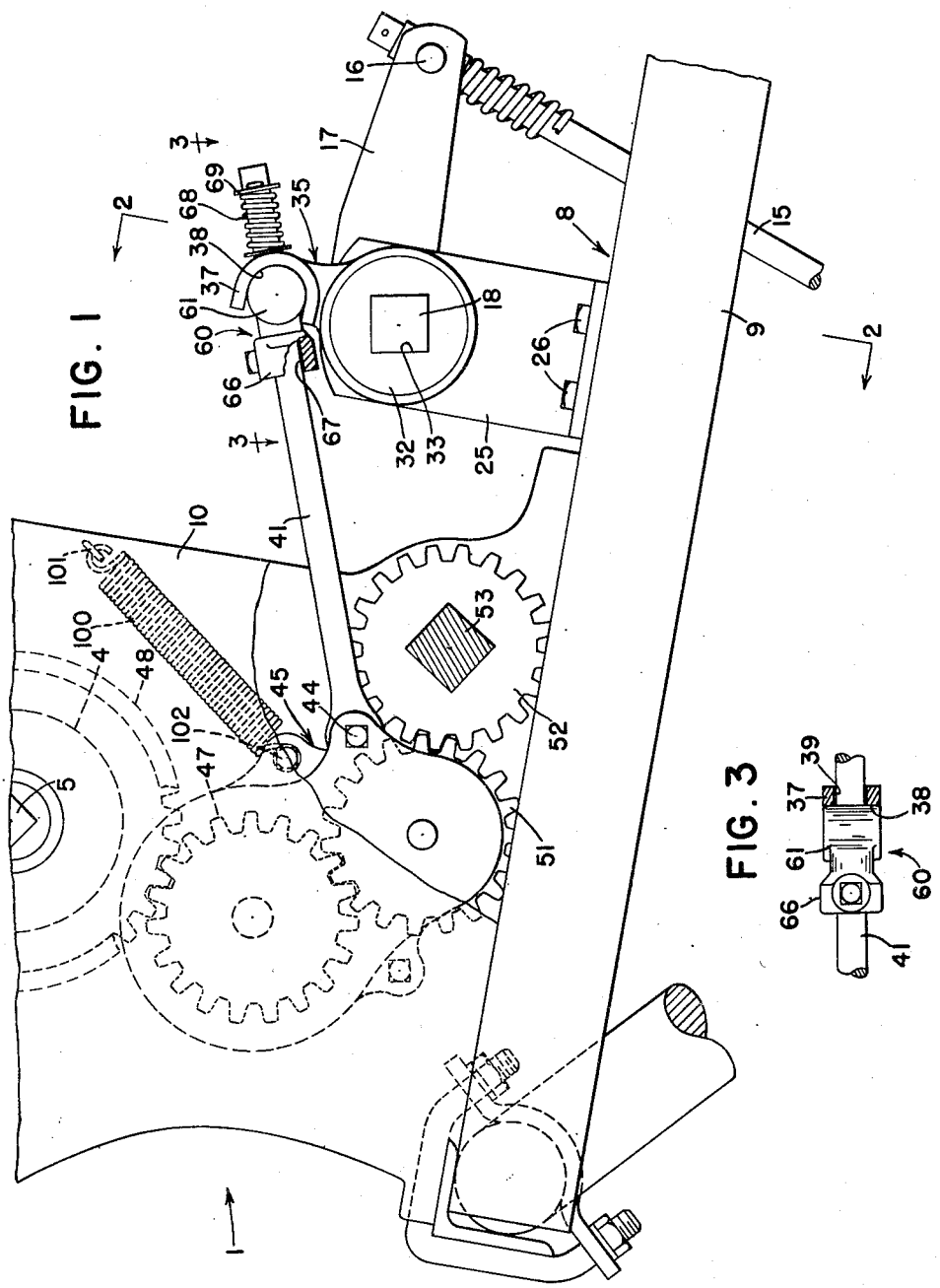
INVENTOR
ERNST E. SCHNELL
BY 
ATTORNEYS July 17, 1951  E. E. SCHNELL  2,561,236
GRAIN DRILL
Filed Nov. 1, 1946 2 Sheets-Sheet 2
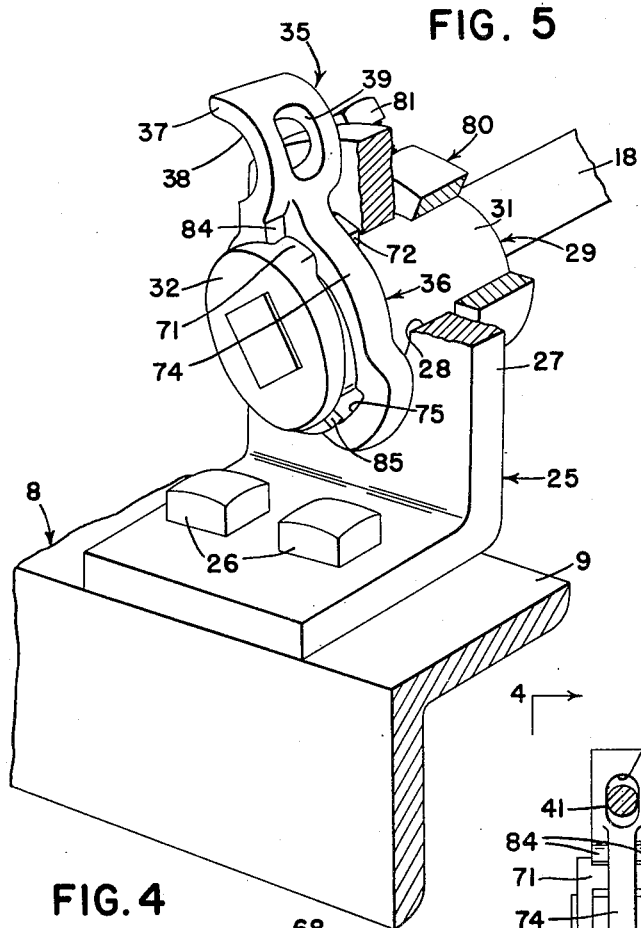
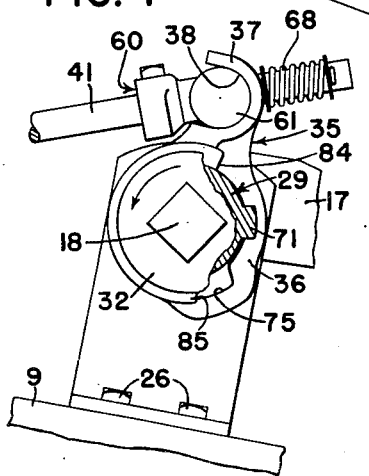
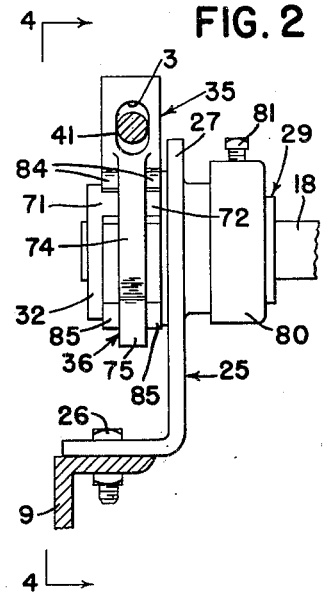
INVENTOR
ERNST E. SCHNELL
BY
ATTORNEYS Patented July 17, 1951

2,561,236

UNITED STATES PATENT OFFICE 2,561,236

GRAIN DRILL

Ernst E. Schnell, Horicon, Wis., assignor to John Deere Van Brunt Company, a corporation of Wisconsin Application November 1, 1946, Serial No. 707,121

11 Claims. (Cl. 74—469)

The present invention relates generally to agricultural implements and more particularly to planting implements, such as grain drills and the like, wherein seeding mechanism is adapted to be moved into or out of gear at the same time furrow forming tools are raised or lowered.

The object and general nature of the present invention is the provision of a new and improved throwout mechanism, especially adapted for grain drills, so constructed and arranged that the seeding mechanism is thrown out of gear as soon as the furrow openers are raised substantially up to ground level and before they are raised out of the ground, whereby no seed is deposited on the surface of the soil. Another feature of importance is the provision of a bearing support for the pressure shaft of a grain drill in which the arm controlling the gear hanger is mounted on the bearing support, the parts being so constructed and arranged as to facilitate assembly and in which only one part serves to hold the bearing bushing in place on the bearing bracket and at the same time automatically holds the gear hanger operating arm in place on the bearing bushing which rocks with the pressure shaft.

These and other objects and advantages of the present invention will be apparent to those skilled in the art after a consideration of the following detailed description, taken in conjunction with the accompanying drawings in which:

Figure 1 is a fragmentary end view of a grain drill in which the principles of the present invention have been incorporated.

Figure 2 is an end view of the throwout mechanism, corresponding to a view taken generally along the line 2—2 of Figure 1.

Figure 3 is a fragmentary top or plan view, taken generally along the line 3—3 of Figure 1, showing the socket connection between the throwout arm and the bearing member on the throwout link.

Figure 4 is a side view of the throwout mechanism, corresponding generally to a view taken along the line 4—4 of Figure 2.

Fig. 5 is a perspective view of the throwout arm and associated parts.

Referring now more particularly to Figure 1, the implement in which the principles of the present invention have been illustrated comprises a grain drill, indicated in its entirety by the reference numeral 1. The grain drill 1 includes a transversely extending seed box carrying seed dispensing mechanism 4 driven by a seeding shaft 5. The seed box is supported on a main frame 8 which includes two or more generally longitudinally extending frame members 9 constituting the end members of the frame 8. The ends of the seed box are supported on the frame by end members 10.

The grain drill 1 also includes conventional furrow openers which are raised and lowered through pressure rods 15 that are connected at their upper ends by swivels 16 with the forward ends, respectively, of pressure arms 17 which at their rear ends are fixed to a rockshaft 18. The rockshaft is operated by manual means or power operated means, as desired, and according to the present invention use is made of the rocking movement of the shaft 18 for controlling the drive to the seed shaft 5.

For supporting the rockshaft 18 I provide a pair of bearing brackets 25 which are secured, as by bolts 26, to the horizontal flange of the associated frame angle 9. The bracket 25 includes an upwardly directed section 27 which is apertured, as at 28, to receive a bearing bushing in the form of a sleeve member 29 having a main section 31 and an outer flange 32. The bushing 29 is provided with a square opening 33 and the shaft 18, which is also square, is received and supported thereby. An arm member 35 is mounted on the bushing 29 and includes a hub section 36 which encircles the body 31 of the bushing 29. The arm 35 includes a portion 37 extending radially outwardly and curved to provide an arcuate socket 38, this portion of the arm member being slotted, as at 39, to receive an operating link 41 that extends therethrough. The inner end of the link 41 is pivotally connected, as at 44, to a gear hanger 45 which is swingably mounted on the grain drill frame and carries an upper gear 47 that is adapted to mesh with a gear 48 that drives the shaft 5, and a lower gear 51 which is adapted to mesh with a gear 52 on a jackshaft 53 that is driven in any suitable way. When the hanger 45 is swung rearwardly, the lower gear 51 is swung out of engagement with the drive shaft gear 52, thereby interrupting the drive to the seeding shaft 5. Movement of the link member 41 serves to swing the gear hanger into and out of gear. The outer end of the link 41 carries a knuckle member 60 which has a cylindrical section 61 adapted to be seated in the socket portion 38 of the arm member 35. The knuckle member 60 also includes an attaching section 66 which has an opening 67 therethrough adapted to receive the link 41, as best shown in Figure 3. A spring 68 encircles the outer end of the link 41 and at its inner end bears against the arcuate section 37 of the arm member 35. The other end of the spring 68 bears against an abutment washer 69 which is held by a cotter or the like on the outer end of the link 41.

A pair of lugs 71 and 72 are formed on the outer end portion of the bearing bushing 29 and are arranged in spaced apart relation. The hub portion 36 of the arm member 35 is provided with a narrowed section 74 which, at a point spaced circumferentially away from the socket section 38, is provided with a laterally directed notched portion 75 that is dimensioned so that in assembling the arm 35 on the bushing 29, the notch 75 clears the lug 72, thereby permitting the arm member 35 to be readily assembled onto the bushing 29. After the arm 35 has been rocked a small amount, the two lugs 71 and 72 engage opposite sides of the narrowed section 74 of the arm member 35, thus holding the arm member in position on the bushing 29. It will be noted that the arm member 35 is thus readily mounted onto the bushing 29. A clamp collar 80 is fixed to the inner end of the bushing 29, as by a set screw 81, and, when properly mounted in place bears against the upper end 27 of the bracket 25 at one side thereof while the lug 72 bears against the opposite side of the associated bracket. This allows the arm member 35 to rock freely on the bushing 29. It will also be noted that the flange 32 on the sleeve 29 bears against the outside portion of the part 35. Thus, with the single attaching member 80, the arm and bearing parts are held in assembled relation.

In operation, the rockshaft 18 is operated by any suitable means so as to raise and lower the tools through the arms 17 and the links 15. The lugs 71 and 72 may shift downwardly along the rib 74 on the arm 35 without occasioning any movement of the latter. However, this lost motion is taken up when the lugs 71 and 72, or either of them, moving upwardly, first come into engagement with the abutment shoulders 84 that are formed on the arm member 35. The member 60 is adjusted so that at about the time the furrow openers are raised up to about ground level but before they are clear of the ground, the lugs 71 and 72 come up against the shoulders 84, so that further movement of the rockshaft 18 in the direction of the arrow shown in Figure 4 will act through the lugs 71 and 72 to rock the arm rearwardly. This acts through the link 41 to swing the gear hanger 45 rearwardly, separating the associated gears 51 and 52 on the hanger and the drive shaft 53, thus interrupting the drive. When the rockshaft 18 is rocked in the other direction, a spring 100, connected between a cotter 101 carried by the end bracket 10 and a bolt 102 on the swingable gear hanger 45, draws the gear 51 into driving engagement with the gear 52. The spring 68 functions to keep the cylindrical section 61 firmly held in the arcuate section 37 of the arm member 35 throughout the adjustment range of the link 41 with the knuckle member 60. Further rocking movement of the pressure shaft 18 and the pressure arms 17 thereon is accommodated by the lugs 71, 72 moving freely away from the shoulders 84.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a grain drill, frame means, a rockshaft, mechanism adapted to be controlled by movement of said rockshaft and including a shiftable member, means for supporting said rockshaft for rocking movement on said frame means, an arm operatively connected with said mechanism, and mounted for movement relative to said rockshaft and a part mounted on said rockshaft in abutting relation with respect to said arm and engageable with the latter for shifting said arm when said rockshaft is moved in one direction, said part being movable away from said arm when the rockshaft is moved in the other direction.

2. In a grain drill, a rockshaft, a bearing bracket for supporting said rockshaft, a bushing rotatably carried by said bearing bracket and receiving said rockshaft in non-rotatable relation, an arm rockably mounted on said bushing, and abutment means acting between said bushing and said arm whereby rocking movement of said rockshaft in at least one direction acts through said bushing and abutment means for shifting said arm.

3. In an agricultural implement, a rockable part having a flange at one end and a lug spaced therefrom, an arm member having a hub section embracing said rockable part and adapted to be disposed in the space between said lug and said flange, said hub section having a notch therein to accommodate axial movement of said hub section over said lug and into position adjacent said flange, and an abutment section on said arm member spaced circumferentially from said notch whereby said lug engages one side of said hub section and holds said arm member in a position between said lug and said flange, said lug being adapted to engage said abutment section of said arm member whereby rocking movement of said part in at least one direction acts through said lug against said arm member for rocking the latter.

4. In a grain drill, frame means, a bearing bracket fixed thereto, a bearing bushing rotatably mounted in said bearing bracket, a rockshaft carried by said bushing and non-rotatably connected therewith, a swinging gear hanger pivotally mounted on said frame means, an arm movably mounted on said bearing bushing, link means connecting the outer end of said arm with the swinging gear hanger, an abutment means on said arm and bearing bushing and adapted when in engagement to cause said arm to rock with said bearing bushing and shaft, rocking of said arm acting through said link means to actuate said swinging gear hanger.

5. In a grain drill having feeding mechanism and drive means therefor including a swingable gear hanger, the combination therewith of means for shifting said gear hanger into and out of a driving position, comprising a rockable part normally having movement about an axis through a given range of movement, an arm movably mounted thereon about said axis and having an outer end formed to receive a connecting link, a link member pivotally connected at one end with said gear hanger, a connecting member fixed to said link means adjacent the other end thereof and operatively connected with the outer end of said arm, and cooperating abutment means mounted on said arm and said rockable part whereby movement of the latter through a portion of its range of movement acts to swing said arm and shift said gear hanger.

6. The invention set forth in claim 5, further characterized by said arm member having an arcuate socket and a slot extending through said arcuate portion, a knuckle member adjustably fixed to the outer end of said link means and seated in said arcuate socket, spring means disposed about the outer end of said link means and bearing against the outer face of said arcuate arm portion, and an abutment member on the outer end of said link means against which the outer end of said spring bears.

7. In an agricultural implement, an apertured bearing bracket, a shaft-receiving bushing carried by said bracket having a cylindrical inner end and a flange at its outer end and insertable into the aperture of said bracket from one side thereof, said bushing also having a pair of axially spaced lugs axially inwardly of said flange, a rockshaft carried in said bushing, an arm carried on said bushing and including a hub portion embracing said bushing and having an extended notched portion providing for the mounting of said arm over the inner of said lugs into a position between said lugs, said arm being rockable about said bushing so as to carry said notched portion away from said lugs whereby the arm is retained in position on said bushing adjacent said flange by said lugs, said assembled arm and bushing being then adapted to be mounted on said bearing bracket by shifting said bushing over the outer end of said shaft and inserting the cylindrical end of said bushing into the aperture in said bracket, a collar on the other side of said bracket adapted to be fixed to the cylindrical end of said bushing for holding the latter in said bracket, the inner of said lugs engaging said one side of said bracket, and abutment means on said arm adapted to be engaged by at least one of said lugs whereby rocking movement relative to said bracket imparted to said bushing by said shaft is transmitted to said arm.

8. In an agricultural implement or the like having a rockshaft, and a bearing bracket for supporting said rockshaft, the improvement comprising a bushing rotatably carried by said bearing bracket and receiving said rockshaft in non-rotatable relation, a pair of axially spaced apart lugs on said bushing, an arm adapted to be rotatably mounted on said bushing and disposed with a portion between said axially spaced apart lugs, a recessed portion on said arm dimensioned to pass over one of said lugs to provide for positioning said arm for rocking movement between said lugs so as to carry said recessed portion away from said lugs, whereby the latter serves to hold said arm against axial displacement relative to the bushing, and abutment means spaced circumferentially from said recessed portion and adapted to act between said bushing and said arm whereby rocking movement of said rockshaft in at least one direction acts through said bushing and abutment means for shifting said arm.

9. In an agricultural implement or the like having a rockshaft and a bearing bracket for supporting said rockshaft: the improvement comprising a bushing adapted to be carried by said bearing bracket and to receive said rockshaft in non-rotatable relation, an arm rockably mounted on said bushing, and abutment means acting between said bushing and said arm whereby rocking movement of said rockshaft in at least one direction acts through said bushing and abutment means for shifting said arm.

10. In a grain drill having frame means, a bearing bracket fixed thereto, a rockshaft adapted to be mounted on the frame means for rotation relative to said bearing bracket, a swinging gear hanger pivotally mounted on said frame means, and link means connected at one end with said gear hanger: the improvement comprising a bearing bushing adapted to be rotatably mounted in said bearing bracket, means for non-rotatably connecting said bearing bushing with said rockshaft, an arm movably mounted on said bearing bushing, and abutment means on said arm and bearing bushing adapted when in engagement to cause said arm to rock with said bearing bushing, and means connecting the outer end of said arm with the other end of said link means whereby rocking of said arm with said bearing bushing and shaft acts through said link means to actuate said swinging gear hanger.

11. In an agricultural implement including frame means, an apertured bearing bracket carried thereby, and a rockshaft adapted to be mounted for rocking movement relative to said bearing bracket: the improvement comprising a shaft-receiving bushing adapted to be carried by said bracket and having a cylindrical inner end and a flange at its outer end and insertable into the aperture of said bracket from one side thereof, said bushing also having a pair of axially spaced lugs axially inwardly of said flange, said bushing being apertured to non-rotatably receive said rockshaft, an arm carried on said bushing and including a hub portion embracing said bushing and having an extended notched portion providing for the mounting of said arm over the inner of said lugs into a position between said lugs, said arm being rockable about said bushing so as to carry said notched portion away from said lugs whereby the arm is retained in position on said bushing adjacent said flange by said lugs, said assembled arm and bushing being then adapted to be mounted on said bearing bracket by shifting said bushing over the outer end of said shaft and inserting the cylindrical end of said bushing into the aperture in said bracket, a collar on the other side of said bracket adapted to be fixed to the cylindrical end of said bushing for holding the latter in said bracket, the inner of said lugs engaging said one side of said bracket, and abutment means on said arm adapted to be engaged by at least one of said lugs whereby rocking movement relative to said bracket imparted to said bushing by said shaft is transmitted to said arm.

ERNST E. SCHNELL.

REFERENCES CITED

The following references are of record in the file of this patent:

UNITED STATES PATENTS

| Number | Name | Date |
| --- | --- | --- |
| 123,196 | Pilson | Jan. 30, 1872 |
| 289,949 | Winter | Dec. 11, 1883 |
| 626,822 | Baseman | June 13, 1889 |
| 656,608 | Moore | Aug. 21, 1900 |
| 928,720 | Ward et al. | July 20, 1909 |
| 1,185,350 | Seaman | May 30, 1916 |
| 1,622,004 | Schwagermann | Mar. 22, 1927 |
| 1,770,641 | Brennan | July 15, 1930 |
| 2,277,913 | Kesling | Mar. 31, 1942 |